(12) United States Patent
Iwabuchi

(10) Patent No.: US 10,730,353 B2
(45) Date of Patent: Aug. 4, 2020

(54) TIRE

(71) Applicant: BRIDGESTONE CORPORATION, Tokyo (JP)

(72) Inventor: Sotaro Iwabuchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/073,025

(22) PCT Filed: Jan. 26, 2017

(86) PCT No.: PCT/JP2017/002742
§ 371 (c)(1),
(2) Date: Jul. 26, 2018

(87) PCT Pub. No.: WO2017/131090
PCT Pub. Date: Aug. 3, 2017

(65) Prior Publication Data
US 2019/0030960 A1     Jan. 31, 2019

(30) Foreign Application Priority Data

Jan. 27, 2016 (JP) ................. 2016-013633

(51) Int. Cl.
*B60C 13/00* (2006.01)
*B60C 11/13* (2006.01)
*B32B 3/30* (2006.01)

(52) U.S. Cl.
CPC ............ *B60C 13/001* (2013.01); *B60C 11/13* (2013.01); *B32B 3/30* (2013.01); *B60C 2011/1361* (2013.01); *Y10T 428/2457* (2015.01)

(58) Field of Classification Search
CPC ....... B60C 13/001; B60C 13/02; B60C 11/13; B60C 2011/1361; Y10T 428/2457; B32B 3/30
See application file for complete search history.

(56) References Cited

U.S. PATENT DOCUMENTS 4,823,856 A * 4/1989 Roberts ................. B60C 13/001
                                                           152/523
6,253,815 B1     7/2001 Kemp et al.
(Continued)

FOREIGN PATENT DOCUMENTS

CN          1286661 A      3/2001
DE     202013000444 U1     2/2013
(Continued)

OTHER PUBLICATIONS

Machine translation of WO 2013/182412 (Year: 2013).*
(Continued)

*Primary Examiner* — Donald J Loney
(74) *Attorney, Agent, or Firm* — Oliff PLC

(57) ABSTRACT

A tire includes: a first pattern portion and a second pattern portion on a tire surface, the first pattern portion being formed of plural first ridges adjacent to each other and the second pattern portion being formed of plural second ridges extending in a different direction from the first ridges in plan view arranged adjacent to each other, in which a height of the first ridges and the second ridges is from 0.2 mm to 0.5 mm and the first ridges adjacent to each other and the second ridges adjacent to each other are arranged at a constant pitch of from 0.15 mm to 0.35 mm.

4 Claims, 7 Drawing Sheets

(56) References Cited

U.S. PATENT DOCUMENTS

| | | |
|---|---|---|
| 8,695,664 B2 | 4/2014 | Fujioka |
| 2009/0218019 A1 | 9/2009 | Paturle |
| 2010/0258231 A1* | 10/2010 | Nakamura ............ B60C 13/001 152/523 |
| 2015/0246587 A1 | 9/2015 | Muhlhoff et al. |
| 2016/0152095 A1 | 6/2016 | Berger et al. |
| 2017/0050473 A1 | 2/2017 | Muhlhoff et al. |

FOREIGN PATENT DOCUMENTS

| | | |
|---|---|---|
| EP | 3 409 508 A1 | 12/2018 |
| EP | 3 409 509 A1 | 12/2018 |
| FR | 3007324 A1 | 12/2014 |
| JP | H11-291722 A | 10/1999 |
| JP | 2009-512584 A | 3/2009 |
| JP | 2014-121978 A | 7/2014 |
| JP | 2014-136487 A | 7/2014 |
| JP | 2014-162447 A | 9/2014 |
| JP | 2015-529170 A | 10/2015 |
| WO | 2013/182412 A1 | 12/2013 |
| WO | 2015/165863 A1 | 11/2015 |
| WO | 2017/130986 A1 | 8/2017 |
| WO | 2017/131019 A1 | 8/2017 |

OTHER PUBLICATIONS

Machine translation of JP 2014-162447 (Year: 2014).*

May 9, 2017 International Search Report issued in International Patent Application No. PCT/JP2017/002742.

Nov. 19, 2018 Extended Search Report issued in European Patent Application No. 17744320.7.

Sep. 30, 2019 Search Report issued in Chinese Patent Application No. 2017800082874.

* cited by examiner

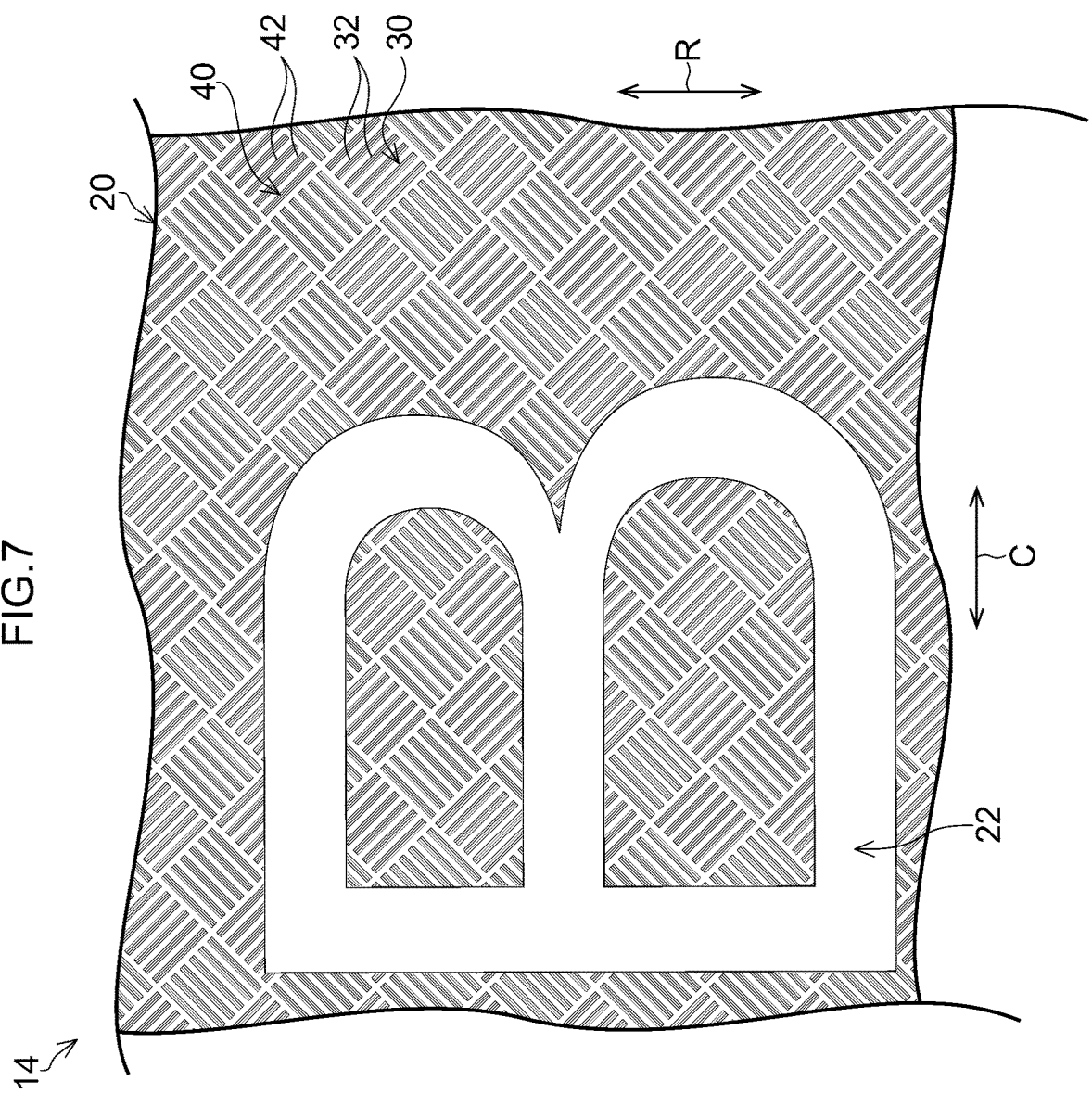

TIRE

TECHNICAL FIELD

The present disclosure relates to a tire on which representation such as characters are formed.

BACKGROUND ART

Japanese National-Phase Publication (JP-A) No. 2009-512584 discloses a technique in which a pattern portion constituted by a plurality of protrusions is formed on a surface of a tire side portion to generate a contrast between the pattern portion and a smooth portion adjacent to the pattern portion, thereby improving visibility of the pattern portion.

SUMMARY OF INVENTION

Technical Problem

Furthermore, the technology disclosed in JP-A No. 2009-512584 tends to be difficult to make rubber flow into holes for forming the protrusions which are provided in a mold at the time of molding and to secure moldability of the protrusions. In addition, the protrusions to be molded are fibrous and it is difficult to secure resistance against abrasion.

In consideration of the above facts, the disclosure aims to provide a tire which improves visibility while increasing a contrast between a pattern portion and the surroundings by controlling reflection of light incident on the pattern portion from each direction and has excellent moldability and durability of a pattern portion constituted by a plurality of protrusions.

Solution to Problem

A tire according to a first aspect of the disclosure includes a first pattern portion and a second pattern portion on a tire surface, the first pattern portion being formed of a plurality of first ridges adjacent to each other and the second pattern portion being disposed adjacent to the first pattern portion and formed of a plurality of second ridges extending in a different direction from the first ridge in plan view and arranged adjacent to each other, wherein a height of the first ridges and the second ridges is from 0.2 mm to 0.5 mm and the first ridges adjacent to each other and the second ridges adjacent to each other are arranged at a constant pitch of from 0.15 mm to 0.35 mm.

In the tire according to the first aspect of the disclosure, the first pattern portion constituted by the plurality of first ridges and the second pattern portion constituted by the plurality of second ridges are formed on the tire surface. (Hereinafter, the first ridge and the second ridge may be collectively referred to as a "ridge". Further, the first pattern portion and the second pattern portion may be collectively referred to as a "pattern portion".) Here, the tire surface is referred to as a surface visible from an outside of the tire such as a tire side portion, a tread portion, a groove bottom of the tread, or a groove wall. In addition, the tire includes both of a pneumatic tire and a non-pneumatic tire (so-called solid tire). It is to be noted that the term "ridge" refers to a protruding portion extending to be elongated along the tire surface.

In the pattern portion, ridges having a height dimension of from 0.2 mm to 0.5 mm are arranged adjacent to each other, and the ridges adjacent to each other are arranged at a pitch of from 0.15 mm to 0.35 mm. For this reason, when light is incident between the wall faces of the adjacent ridges, the light is repeatedly reflected between the wall surfaces and is gradually attenuated. In this way, it is possible to suppress reflection of the light incident to the pattern portion.

Since the ridges adjacent to each other are arranged at a constant pitch, unevenness of reflected light is less likely to occur, as compared with a case in which the pitches are uneven. Further, for example, the ridges can be densely arranged. For this reason, an effect of suppressing the reflection of the light by making the reflected light uniform is enhanced.

In addition, the first ridges and the second ridges extend in different directions. Therefore, the first pattern portion and the second pattern portion can efficiently attenuate light from different directions. As a result, reflection of light from a plurality of directions can be suppressed. Further, in the ridge whose extending direction is close to a direction orthogonal to the direction of light, the reflection of light can be suppressed, whereas in the ridge whose extending direction is close to the direction of light, the reflection of light becomes stronger as compared with the ridge whose extending direction is close to the direction orthogonal to the direction of light. Therefore, in the first pattern portion and the second pattern portion, the reflection of light can be suppressed on the one hand and the reflection of light can be strengthened on the other hand. Therefore, a pattern is formed by the first pattern portion and the second pattern portion, and the visibility is improved.

Further, since the pattern portions are constituted by the ridges, rubber easily flows into a mold for molding the tire as compared with, for example, a case in which the pattern portions are constituted by fibrous protrusions. Therefore, the pattern portion is excellent in moldability. In addition, the ridges are higher in rigidity, and are less vulnerable to external forces, as compared with the fibrous protrusions Therefore, the pattern portion is excellent in durability.

In the tire according to the second aspect of the disclosure, in the tire according to the first aspect, the angle formed by the wall surfaces which configure the first ridges and the second ridges and face each other is set to be from 15° to 40°.

According to the tire of the second aspect of the disclosure, when the angle formed by the wall surfaces is larger than 15°, a ratio in which reflected light from the wall surfaces returns from a space between the ridges to the outside is increased, such that improvement of visibility is suppressed. That is, the light is reflected, such that a difference in contrast with the bright portion is reduced, thereby suppressing the improvement of the visibility. Meanwhile, when the angle θ is smaller than 15°, the ridges easily collapse.

In a tire according to a third aspect of the disclosure, in the tire of the first and second aspects, the first pattern portion and the second pattern portion are formed alternately.

According to the tire of the third aspect of the disclosure, the reflection of light becomes regular as compared with a case in which the first pattern portion and the second pattern portion are not alternately formed. Therefore, it is possible to uniformly suppress the reflection of light over a wide range.

Advantageous Effects of Invention

According to the disclosure, it is possible to provide the tire which improves the visibility while increasing the contrast between the pattern portion and the surroundings by controlling the reflection of the light incident on the pattern portion from each direction and improves the moldability and durability of the pattern portion.

BRIEF DESCRIPTION OF DRAWINGS

FIG. 7 is an enlarged plan view of a part of a mark portion of the tire according to the present embodiment.

DESCRIPTION OF EMBODIMENTS

First Embodiment

Figure 1:
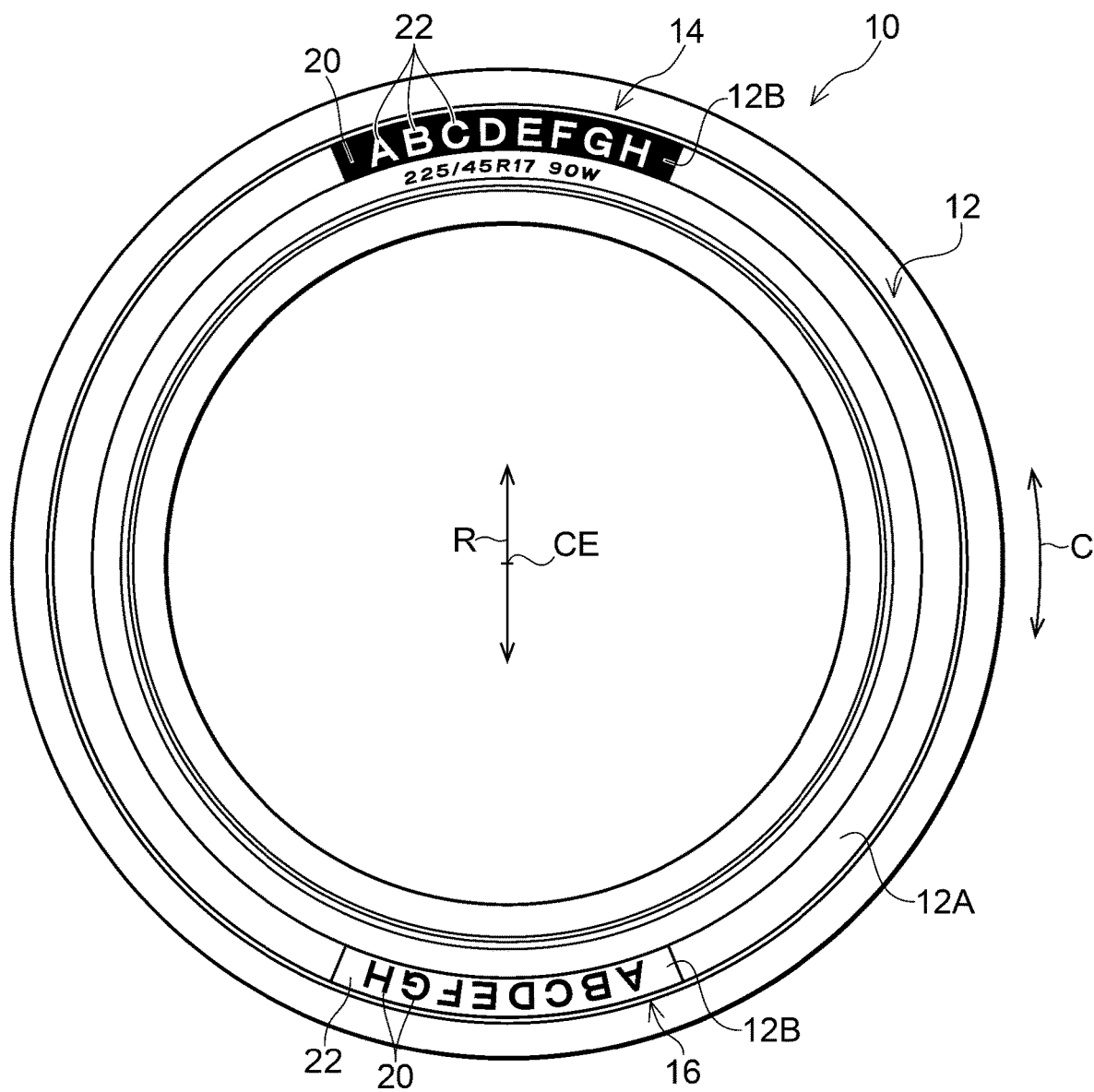
FIG. 1 is a side view of a tire according to an embodiment of the disclosure.

Hereinafter, a first embodiment of the disclosure will be described with reference to the drawings. In FIG. 1, a side view of a tire 10 according to the present embodiment is shown. In the present embodiment, C refers to a circumferential direction of the tire, and R refers to a radial direction of the tire. The tire 10 may be a pneumatic tire or may be a non-pneumatic tire.

(Mark Portion)

A first mark portion 14 and a second mark portion 16 that form representation are formed on a tire side portion 12 (decorative portion) which configures a tire surface. The first mark portion 14 and the second mark portion 16 have belt-like arc shapes, and are formed symmetrically with respect to a center axis CE of the tire. In addition, the first mark portion 14 and the second mark portion 16 have dark portions 20 looking black in appearance and bright portions 22 looking brighter than the dark portions 20, respectively. It is preferable that the first mark portion 14 and the second mark portion 16 are arranged outside a maximum width portion (that is, a part in which a linear distance between the tire side portions is the maximum) of the tire in the radial direction of the tire.

In the first mark portion 14 provided on an upper side of the page space of FIG. 1, the bright portion 22 is configured by characters such as "ABCDEFGH" formed of a smooth surface, and the dark portion 20 is formed at an outer circumferential portion of the bright portion 22. The dark portion 20 is a kind of decorative band, and is formed so as to surround the characters formed by the bright portion 22.

Meanwhile, in the second mark portion 16 provided on a lower side of the page space of FIG. 1, characters such as "ABCDEFGH" are formed by the dark portion 20, and an outer circumferential portion of the dark portion 20 is configured by the bright portion 22. In the second mark portion 16, the bright portion 22 configures a kind of decorative band, and is provided so as to surround the characters formed by the dark portion 20. The bright portion 22 is configured by a smooth surface like a general surface 12A which configures a surface of the tire side portion 12 other than the mark portion, and the bright portion 22 is configured by a step surface 12B recessed inward from the general surface 12A.

Figure 2:
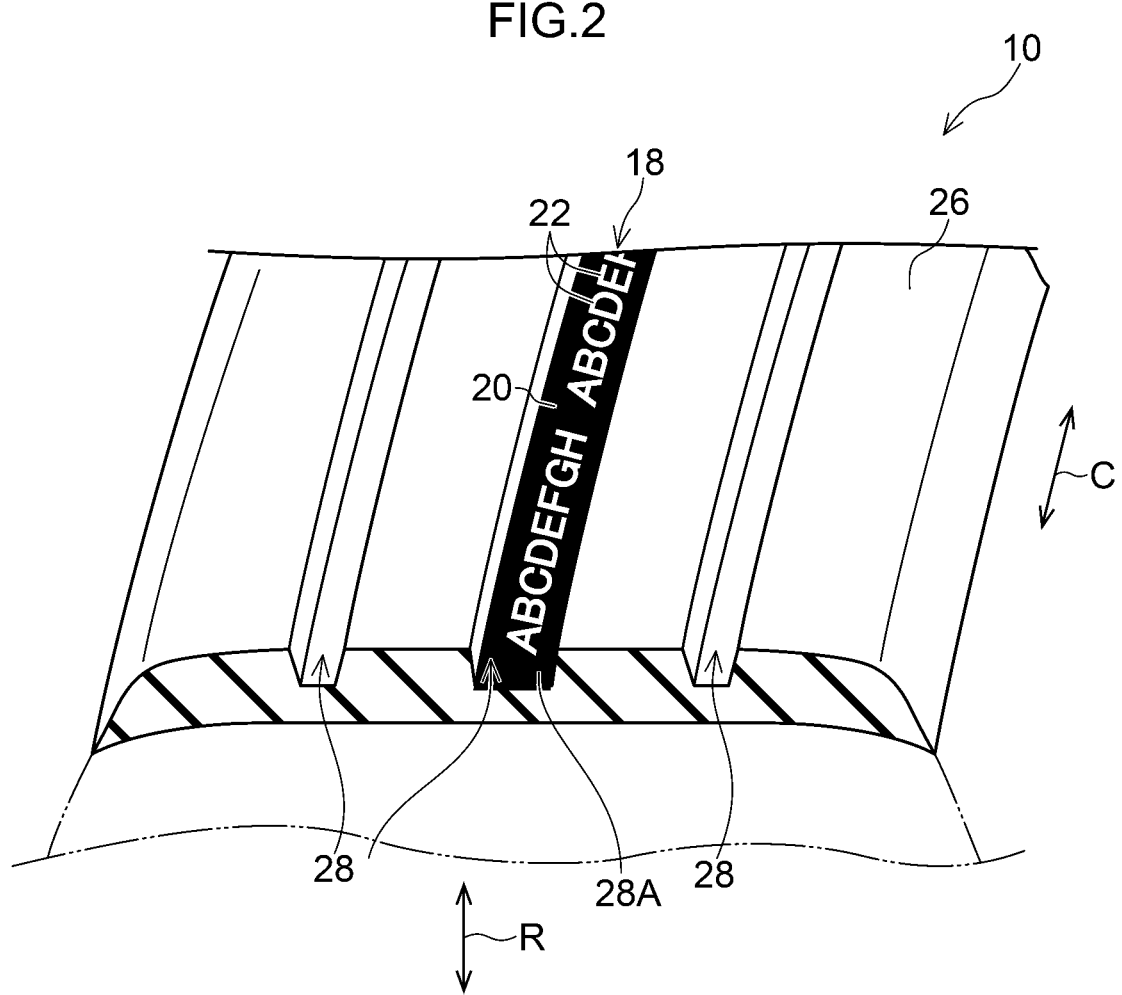
FIG. 2 is a partial perspective cross-sectional view of a tread of the tire according to the embodiment of the disclosure.

In addition, the tire 10 includes a tread 26 at an outer side in the radial direction R of the tire, as shown in FIG. 2. In the tread 26, a plurality of circumferential grooves 28 are formed. A third mark portion 18 forming representation is formed on a groove bottom 28A (decorative portion) of the circumferential grooves 28 which configures the tire surface. The third mark portion 18 has a belt-like shape, and is formed on a part of the circumferential groove 28. The third mark portion 18 also has a dark portion 20 looking black in appearance and a bright portion 22 looking brighter than the dark portion 20.

In the third mark portion 18, the bright portion 22 is configured by characters such as "ABCDEFGH" formed of a smooth surface, and the dark portion 20 is formed at an outer circumferential portion of the bright portion 22. The dark portion 20 is a kind of decorative band, and is formed so as to surround the characters formed by the bright portion 22.

The first mark portion 14, the second mark portion 16, and the third mark portion 18 including the dark portions 20 can be formed by providing corresponding protrusions and recesses in a mold of the tire 10 by laser processing.

(Pattern Portion)

Figure 3:
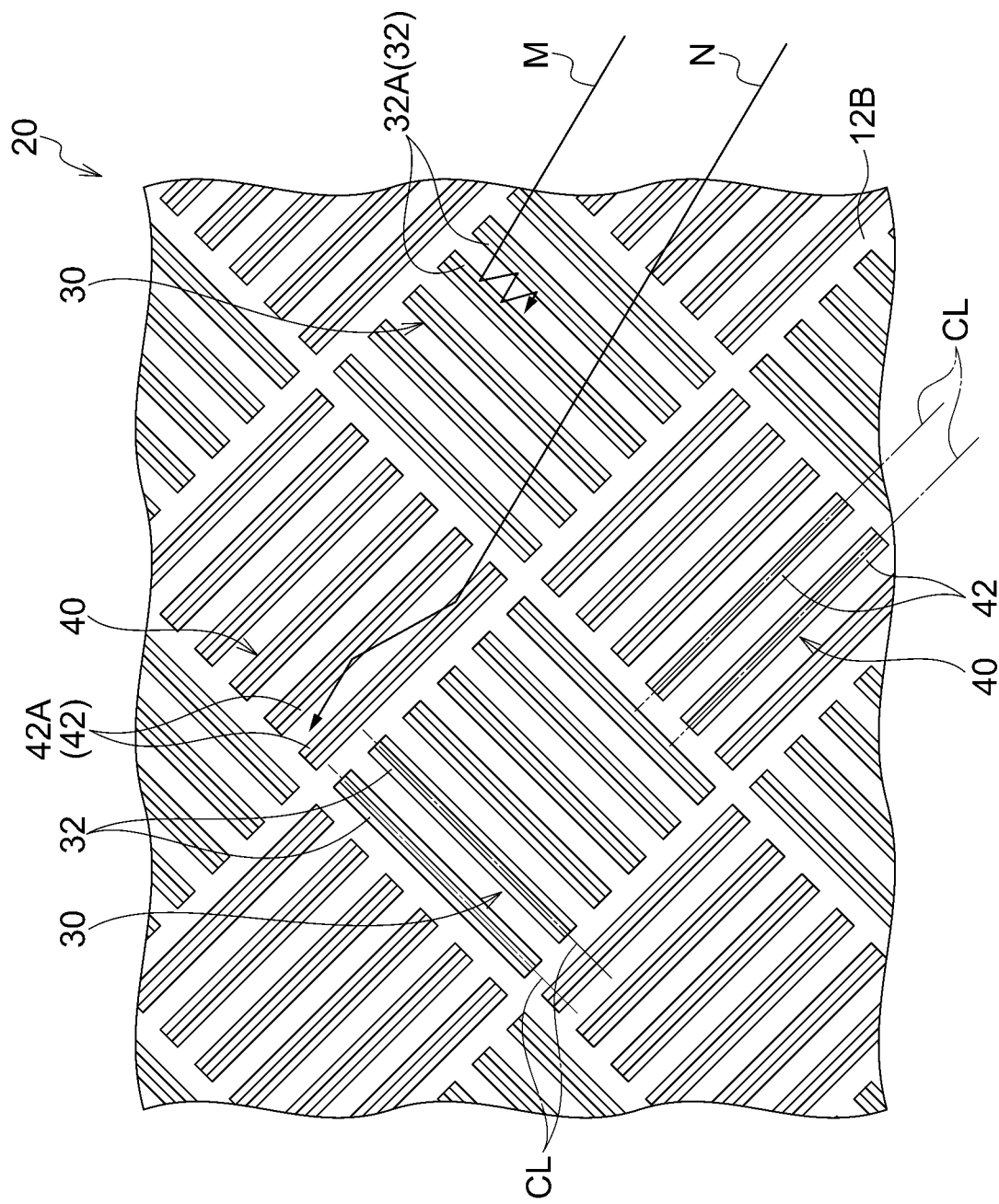
FIG. 3 is a plan view showing an example of a dark portion of the tire according to the first embodiment of the disclosure.

As shown in FIG. 3, the dark portion 20 of the first mark portion 14 is constituted by a first pattern portion 30 and a second pattern portion 40 which are formed on a step surface 12B recessed inward from the general surface 12A (see FIG. 1) of the tire side portion 12. The first pattern portion 30 is formed by arranging the plurality of ridges 32, which are an example of the first ridges of the disclosure in which the ridgeline CL is linear in plan view, adjacently in parallel along the tire surface and in a direction orthogonal to the extending direction of the ridges 32. The second pattern portion 40 is formed by arranging the plurality of ridges 42, which are an example of the second ridges of the disclosure extending in the direction orthogonal to the ridge 32, in parallel along the tire surface and in the direction orthogonal to the extending direction of the ridges 42. The first pattern portion 30 and the second pattern portion 40 are alternately arranged adjacent to each other to form a checkered pattern (in other words, a grid pattern). Other dark portions 20 of the second mark portion 16 and the third mark portion 18 also have the same structure. The same goes for the following description.

(Ridge)

Figure 6A:
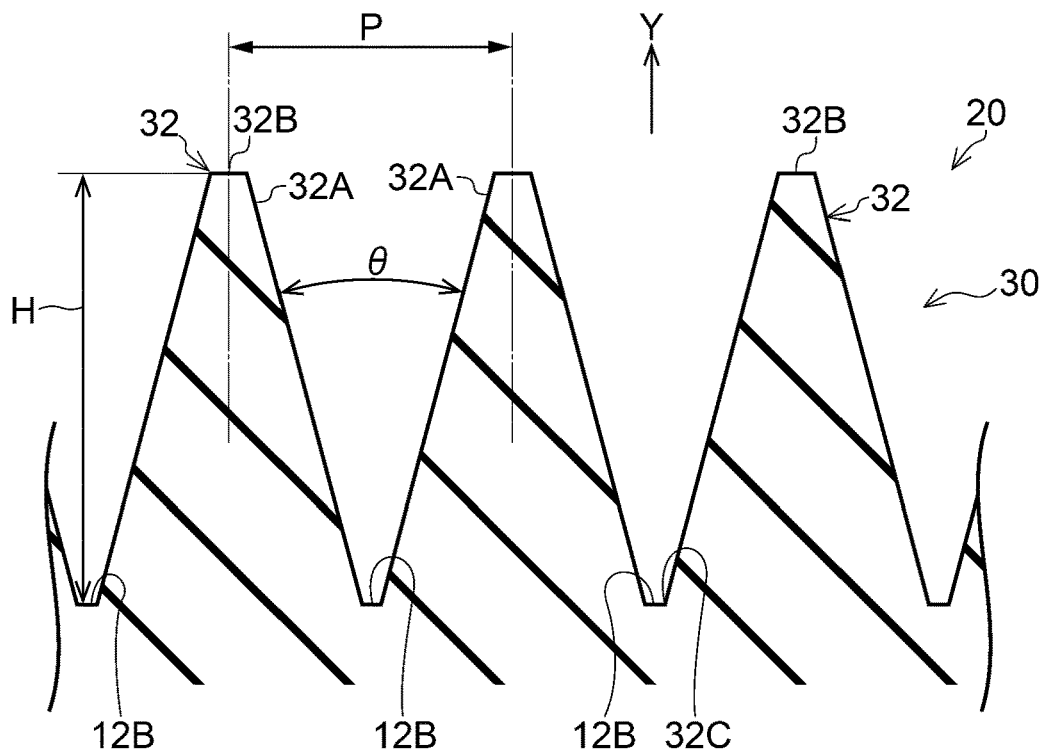
FIG. 6A is an enlarged cross-sectional view of a first ridge constituting the dark portion according the embodiment of the disclosure.

As shown in FIG. 6A, wall surfaces 32A of both sides of the ridge 32 are inclined with respect to a protruding direction (a direction shown by an arrow Y in FIG. 6A) so that an interval between the wall surfaces 32A of both sides of the ridge 32 is gradually increased from a top portion 32B toward a base portion 32C when viewed from a cross section in a direction orthogonal to an extending direction of the ridge 32. Further, in the present embodiment, the wall surfaces 32A of the ridge 32 continuously extend in a straight line shape from the top portion 32B to the base portion 32C. It should be noted that the "base portion 32C" mentioned herein refers to a boundary part between the ridge 32 and the step surface 12B.

The top portion 32B is a flat surface when viewed from the cross section in the direction orthogonal to the extending direction of the ridge 32, and a height H of the ridge 32, that is, a dimension of the ridge 32 from the top portion 32B to the step surface 12B in the radial direction of the tire is set to be from 0.3 mm to 0.4 mm.

It should be noted that a case in which the height H of the ridge 32 is set to be from 0.3 mm to 0.4 mm is described in the present embodiment, but the embodiment of the disclosure is not limited thereto. For example, this height H can be in a range from 0.2 mm to 0.5 mm, and it is possible to obtain a predetermined effect as long as the height H is in this range.

The dark portion 20 is configured to look dark by repeatedly reflecting and attenuating light between a wall surface 32A of one ridge 32 and a wall surface 32A of another ridge 32, in a space between adjacent ridges 32.

In this case, when the height H of the ridge 32 is less than 0.3 mm, an effect in which the dark portion 20 looks black starts to be decreased, and when the height H is less than 0.2 mm, this effect is significantly decreased. Meanwhile, when the height H of the ridge 32 exceeds 0.4 mm, it is easy for the ridge 32 to be deformed due to an external force, and when the height H exceeds 0.5 mm, it is difficult to ensure moldability in a manufacturing process.

For this reason, it is preferable that the height H of the ridge 32 is set to be from 0.2 mm to 0.5 mm and it is more preferable that the height H is set to be from 0.3 mm to 0.4 mm.

Pitches P between adjacent ridges 32 are set to be equidistant pitches from 0.2 mm to 0.3 mm. The pitch P is represented by a separation distance between the ridgelines CL of the ridges 32. The ridgeline CL is the center line of the top portion 32B (in other words, a line along the extending direction of the ridge 32), and is denoted by alternated long and short dash lines in FIG. 3.

It should be noted that a case in which the pitch P between the ridges 32 is set to be from 0.2 mm to 0.3 mm is described in the present embodiment, but the embodiment of the disclosure is not limited thereto. For example, the pitch P can be in a range from 0.15 mm to 0.35 mm, and it is possible to obtain a predetermined effect as long as the pitch P is in this range.

The dark portion 20 is configured to look black by darkening the space between the adjacent ridges 32. However, when the pitch P between the adjacent ridges 32 exceeds 0.3 mm, an effect in which the dark portion 20 looks black due to the space between the ridges 32 starts to be decreased, and when the pitch P exceeds 0.35 mm, this effect is significantly decreased. In addition, when the pitch P is less than 0.15 mm, moldability is deteriorated.

For this reason, it is preferable that the pitch P between the adjacent ridges 32 is set to be from 0.15 mm to 0.35 mm, and it is more preferable that the pitch P is set to be from 0.2 mm to 0.3 mm.

The wall surfaces 32A of both sides of the ridge 32 are inclined, and an angle θ formed by facing wall surface 32A in the adjacent ridges 32 is set to be from 15° to 40°. For this reason, the mold is easily removed during the manufacturing of the tire and the moldability is improved. As a result, the collapse of the ridges is reduced, and the durability of the ridges is improved.

Here, when the angle θ formed by the wall surfaces 32A of the ridges 32 is less than 15°, it is easy for the ridges 32 to be deformed and collapse. Meanwhile, when the angle θ formed by the wall surfaces 32A of the ridges 32 exceeds 40°, a ratio in which reflected light from the wall surfaces 32A is emitted from the dark portion 20 is increased.

For this reason, it is preferable that the angle θ formed by the wall surfaces 32A of the adjacent ridges 32 is set to be from 15° to 40°.

The configuration of the ridge 32 forming the first pattern portion 30 has been described above, as shown in FIG. 6B, and the ridge 42 constituting the second pattern portion 40 also has the same configuration.

(Action and Effect)

Next, an action and effect of the tire according to the present embodiment will be described. On the tire side portion 12 or the groove bottom 28A of the circumferential groove 28 of the tread 26, the first mark portion 14, the second mark portion 16, and the third mark portion 18 that form the mark are provided. The dark portion 20 constituting the first mark portion 14, the second mark portion 16, and the third mark portion 18 is constituted by the first pattern portion 30 in which the ridges 32 having a height H of from 0.3 mm to 0.4 mm are arranged adjacent to each other and the second pattern portion 40 in which the ridges 42 extending in the direction orthogonal to the ridges 32 are arranged adjacent to each other.

Therefore, for example, when light is incident from a direction close to a direction orthogonal to the wall surface 32A of the ridge 32, as shown by an arrow M in FIG. 3, the number of reflections of light is increased between the wall surfaces 32A of the ridge 32 and thus the light is attenuated, such that the first pattern portion 30 looks black. On the other hand, as shown by an arrow N in FIG. 3, the number of reflection of light is reduced between the wall surfaces 42A of the ridge 42, and the attenuating effect of light of the second pattern portion 40 is reduced as compared with the first pattern portion 30, such that blackness is suppressed.

Conversely, for example, when light is incident from the direction close to a direction orthogonal to the wall surface 42A of the ridge 42, the second pattern portion 40 looks blacker than the first pattern portion 30. As described above, since the extension directions of the ridges 32 and 42 arranged in the first pattern portion 30 and the second pattern portion 40, respectively, are different from each other, in the dark portion 20 including the first pattern portion 30 and the second pattern portion 40, it is possible to suppress the reflection of light incident on the tire 10 from each direction. As a result, since the pattern portion looks black even when viewed from various angles, the visibility is improved.

In addition, the pitches P between the adjacent ridges 32 and 42 are configured to be equidistant from 0.2 mm to 0.3 mm. For this reason, as compared with a case in which the ridges 32 and 42 are arranged so that adjacent intervals therebetween are uneven, the ridges 32 and 42 can be densely arranged. This makes it possible to make the dark portion 20 look black.

Each of the wall surfaces 32A and 42A of the ridges 32 and 42 are inclined, and the angle θ formed by the opposing wall surfaces 32A and 42A in the adjacent ridges 32 and 42 is set to be from 15° to 40°.

When the angle formed by the wall surfaces is larger than 15°, a ratio in which the reflected light from the wall surfaces returns from a space between the ridges to the outside is increased, such that improvement of visibility is suppressed. That is, the light is reflected, such that a difference in contrast with the bright portion is reduced, thereby suppressing the improvement of the visibility. Meanwhile, when the angle θ is smaller than 15°, the ridges easily collapse. In addition, when the angle θ exceeds 40°, a ratio in which the reflected light from the wall surfaces 32A is emitted from the dark portion 20 becomes significantly large. For this reason, it is possible to negotiate the visibility while maintaining shapes of the ridges.

In addition, the top portions 32B and 42B of the ridges 32 and 42 are flat surfaces. Therefore, the rigidity of the top portions 32B and 42B is high as compared with a case in which the flat surface is not formed, and the durability of the ridges 32 and 42 is improved.

In the present embodiment, the top portions 32B and 42B of the ridges 32 and 42 are flat surfaces, but the embodiment of the disclosure is not limited thereto, and for example, the top portions 32B and 42B of the ridges 32 and 42 may be vertices of a sharp shape. For this reason, as compared with a case in which the top portion 32B is formed as a flat surface, it is possible to suppress the reflected light from being directly viewed. For this reason, it is possible to improve the visibility by increasing a contrast of the pattern portions 30 and 40. Alternatively, the top portions 32B and 42B may be a curved shape such as a circular arc. It is possible to suppress the reflected light from being directly viewed even though the top portions 32B and 42B have the curved shape.

Figure 6B:
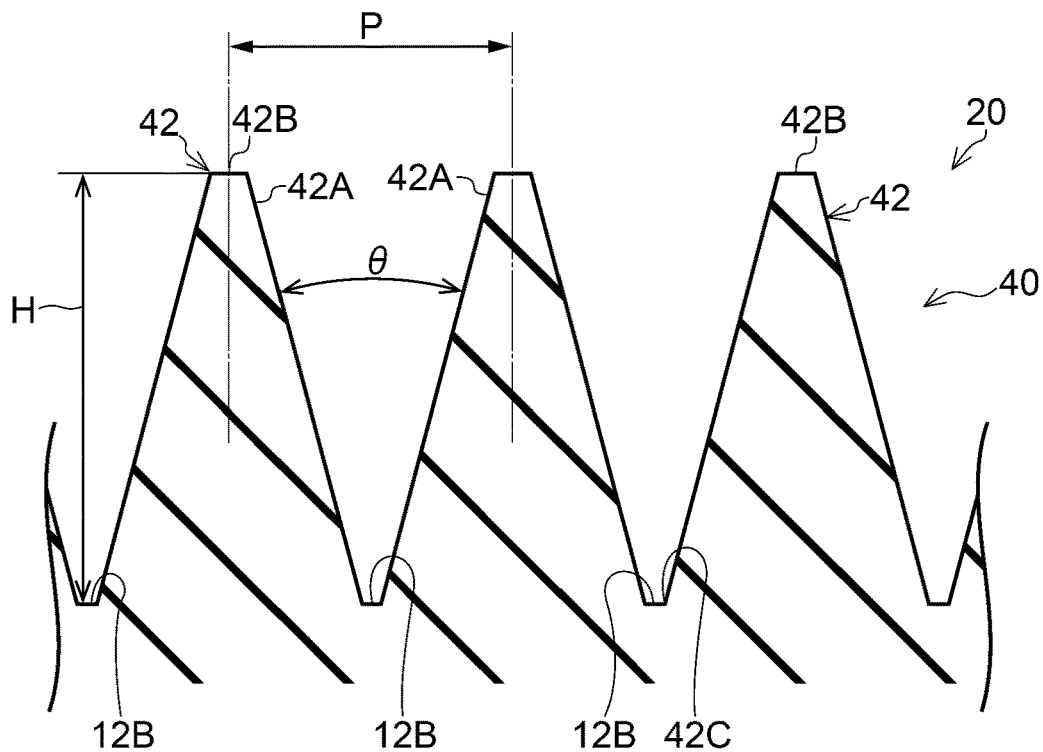
FIG. 6B is an enlarged cross-sectional view of a second ridge constituting the dark portion according the embodiment of the disclosure.

In the above-described embodiment, only a case in which the wall surfaces 32A and 42A of the ridges 32 and 42 extend linearly as shown in FIGS. 6A and 6B has been described, but the embodiment of the disclosure is not limited thereto, and the wall surface may extend in a curved line or may be bent in a polygonal line shape, a zigzag shape, or the like. In this case, light is scattered between the wall surfaces 32A and 42A as compared with a case in which the wall surfaces 32A and 42A extend in the linear shape. Therefore, it is possible to approximate the appearance of the reflected light in the first pattern portion and the second pattern portion.

In FIG. 7, a part of the first mark portion 14 is shown. A character constituting the bright portion 22 is constituted by a smooth surface and has gloss, and reflects light. The bright portion 22 is surrounded by the dark portion 20 which absorbs light to suppress the reflection of light. Therefore, the contrast is increased between the bright portion 22 reflecting light and the dark portion 20 absorbing light, whereby the visibility of the character displayed on the first mark portion 14 can be increased.

In the present embodiment, the direction in which the first pattern portion 30 and the second pattern portion 40 are adjacent is defined as the direction along the extending direction of the first ridge 32 and the vertical direction, and the first pattern portion 30 and the second pattern portion 40 form a checkered pattern (in other words, a grid pattern), but the embodiment of the disclosure is not limited thereto. For example, the direction in which the first pattern portion 30 and the second pattern portion 40 are adjacent is inclined by 45° with respect to the extending direction of the first ridge 32, and thus the first pattern portion 30 and the second pattern portion 40 may be arranged in a zigzag shape. Also, the inclination angle is not limited to 45°, and can be selected appropriately. As described above, the state in which the first pattern portion 30 and the second pattern portion 40 are alternately formed in the disclosure generally indicates the state in which the direction in which the first pattern portion 30 and the second pattern portion 40 are adjacent to each other is not limited, but a certain region of the tire side portion 12 is covered by the regular arrangement of the first pattern portion 30 and the second pattern portion 40.

In addition, in the present embodiment, the base portion 32C is a portion at which the wall surface 32A which is a plane, and the step surface 12B which is a plane intersect each other, and is formed to be bent in a polygonal line shape when viewed from a cross section in a direction orthogonal to the extending direction of the ridge 32, but the embodiment of the disclosure is not limited thereto. For example, the base portion 32C may be formed so as to draw a curve line when viewed from the cross section in the direction orthogonal to the extending direction of the ridge 32. That is, the wall surface 32A and the step surface 12B may be connected by the base portion 32C having a curved shape. Alternatively, the step surface 12B may be formed in a curved line shape. The ridges 32 are formed as described above to suppress the reflection of the light, such that it is possible to increase the contrast of the pattern portion 30 to increase the visibility of the pattern portion 30.

Second Embodiment

Figure 4:
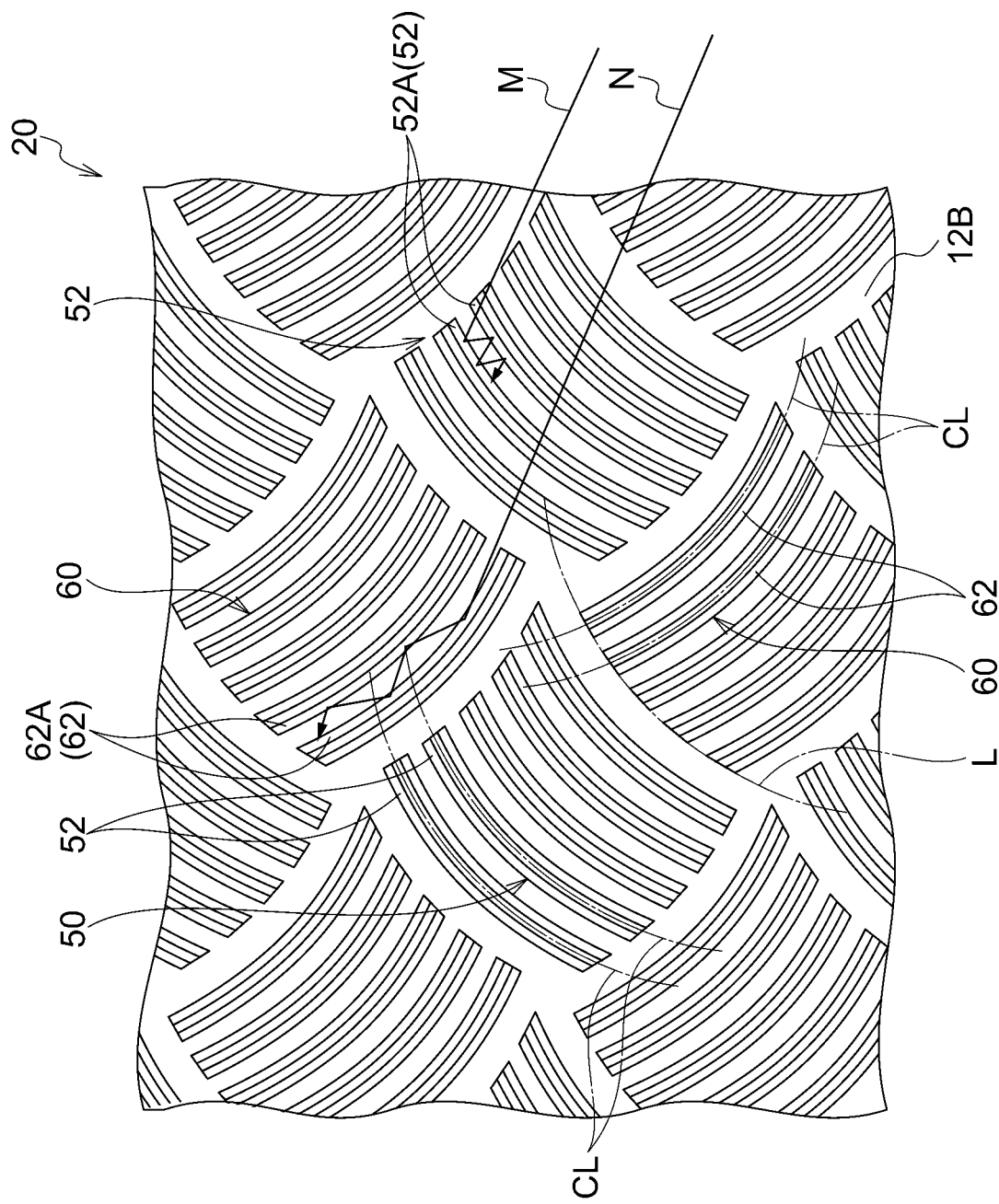
FIG. 4 is a plan view showing an example of a dark portion of a tire according to a second embodiment of the disclosure.

Next, a second embodiment of the disclosure will be described. The same reference numerals are given to the same components as those of the first embodiment, and a description thereof will be appropriately omitted. In FIG. 4, a dark portion 20 in the second embodiment is shown.

In ridges 52 and 62 of the second embodiment, a ridgeline CL is formed in an arc shape in plan view, and a first pattern portion 50 and a second pattern portion 60 are each constituted by arranging a plurality of ridges 52 and 62 adjacently. An adjacent direction and an adjacent interval are adjusted so that an imaginary line L connecting the ridges 52 adjacent to each other and end portions of the ridges 62 also has an arc shape.

When light is incident on the first pattern portion 50 and the second pattern portion 60 of the second embodiment, as shown by arrows M and N in FIG. 4, since the ridgelines CL of the ridges 52 and 62 are formed in an arc shape, the incident light hardly passes linearly between the wall surfaces 52A and 62A of the ridges 52 and 62. For this reason, the reflection is repeated between the wall surfaces 52A and 62A. Therefore, as compared with a case in which the ridgeline CL of the ridge is formed in a linear shape, the attenuating effect of light can be enhanced.

Figure 5:
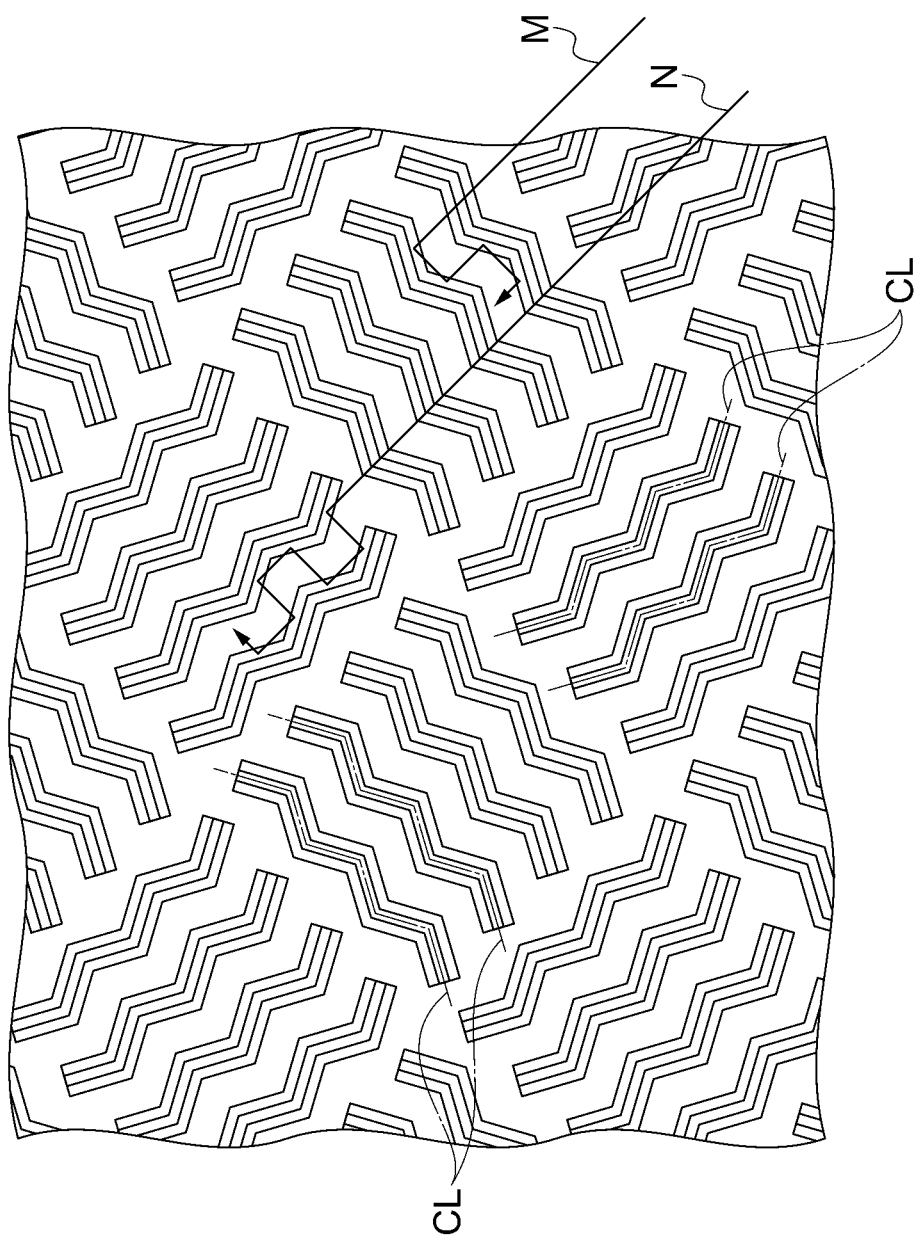
FIG. 5 is a plan view showing a modified example of the dark portion of the tire according to the embodiment of the disclosure.

In addition, in FIG. 5, a modified example of the embodiment of the disclosure is shown. As shown in FIG. 5, the ridgeline CL of the ridge can also be formed in a zigzag shape in plan view, for example. Even if the ridgeline CL is formed in a zigzag shape, as shown by arrows M and N in FIG. 5, the incident light is repeatedly reflected between the wall surfaces of the ridge, whereby the attenuating effect of light can be increased.

The disclosure of Japanese Patent Application No. 2016-013633 filed on Jan. 27, 2016 is hereby incorporated by reference in its entirety. All documents, patent applications, and technical standards mentioned in the present specification are hereby incorporated by reference to the same extent as a case in which individual documents, patent applications, and technical standards are specifically and individually indicated to be hereby incorporated by reference.

The invention claimed is:

1. A tire comprising:
a first pattern portion and a second pattern portion on a tire surface, the first pattern portion being formed of a plurality of first ridges adjacent to each other and the second pattern portion being disposed adjacent to the first pattern portion and formed of a plurality of second ridges extending in a different direction from the first ridges in plan view and arranged adjacent to each other,
wherein a height of the first ridges and the second ridges is from 0.2 mm to 0.5 mm and the first ridges adjacent to each other and the second ridges adjacent to each other are arranged at a constant pitch of from 0.15 mm to 0.35 mm.

2. The tire according to claim 1, wherein an angle formed by wall surfaces that configure the first ridges and face each other is from 15° to 40° and an angle formed by wall surfaces that configure the second ridges and face each other is from 15° to 40°.

3. The tire according to claim 1, wherein the first pattern portion and the second pattern portion are formed alternately.

4. The tire according to claim 2, wherein the first pattern portion and the second pattern portion are formed alternately.

* * * * *